United States Patent [19]

Sasaki

[11] Patent Number: 4,943,087
[45] Date of Patent: Jul. 24, 1990

[54] WARNING DEVICE FOR PASSIVE SEAT BELT SYSTEM

[75] Inventor: Takanobu Sasaki, Yokohama, Japan

[73] Assignee: Nippon Seiko Kabushiki Kaisha, Tokyo, Japan

[21] Appl. No.: 341,691

[22] Filed: Apr. 21, 1989

[30] Foreign Application Priority Data

Apr. 25, 1988 [JP] Japan .............................. 63-55768[U]
Mar. 15, 1989 [JP] Japan ................................ 1-29517[U]

[51] Int. Cl.$^5$ ............................................. B60R 22/00
[52] U.S. Cl. .................................... 280/804; 297/468
[58] Field of Search ............... 280/804, 802, 807, 803, 280/806; 297/468, 469; 307/10.1; 180/268, 271

[56] References Cited

U.S. PATENT DOCUMENTS

| 4,225,155 | 9/1980 | Seiffert et al. | 280/804 |
| 4,681,347 | 7/1987 | Tamura et al. | 280/804 |
| 4,697,826 | 10/1987 | Morner | 280/804 |
| 4,717,174 | 1/1988 | Nishimura | 280/804 |

FOREIGN PATENT DOCUMENTS 195943 12/1982 Japan .

Primary Examiner—Richard A. Bertsch
Attorney, Agent, or Firm—Wegner & Bretschneider

[57] ABSTRACT

A warning device for a passive seat belt system is disclosed. It includes an emergency release buckle; a tongue; a magnet displaceable between a first position and a second position, said magnet assuming the first position while the tongue and buckle are latched but a second position while the tongue and buckle are unlatched; an anchor base member; and a magnetic flux sensor for detecting a magnetic flux from the magnet. In a preferred embodiment, the warning device further includes a magnetic shielding means made of a high-permeability material and allowing magnetic flux to pass under low magnetic resistance to the magnetic flux sensor except for an area on a magnetic-flux-travelling path extending from the magnet to the sensor. In another preferred embodiment, the magnet may be arranged between the anchor base member and the buckle.

9 Claims, 7 Drawing Sheets

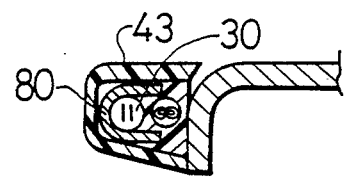
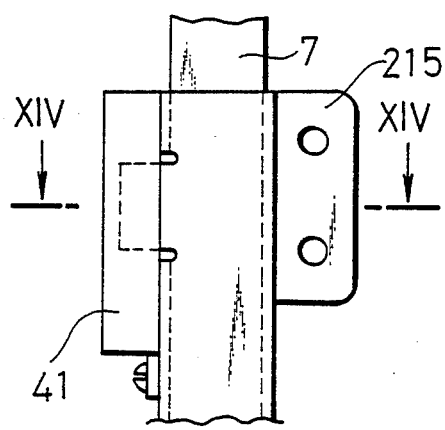
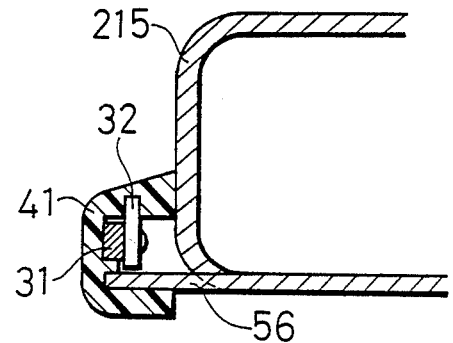
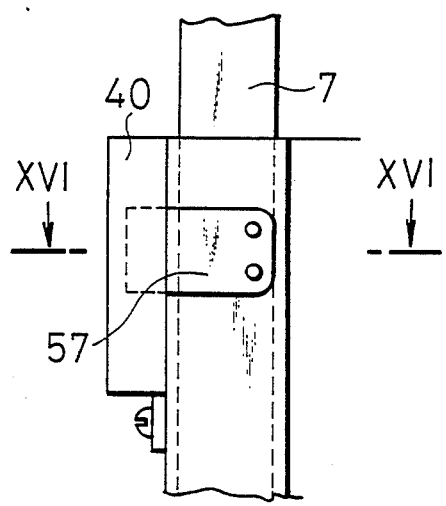
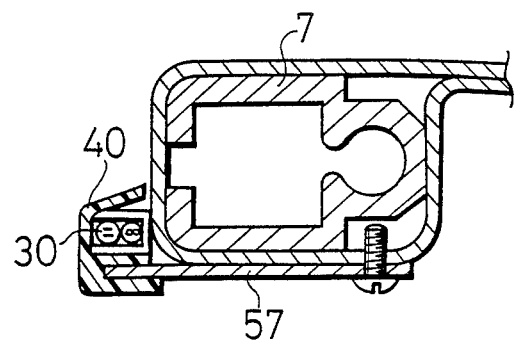

WARNING DEVICE FOR PASSIVE SEAT BELT SYSTEM

BACKGROUND OF THE INVENTION (1) Field of the Invention

This invention relates to an improvement to a warning device suitable for use in a passive seat belt system in which an occupant-restraining webbing is automatically brought into contact with or out of contact from the body of an occupant. When a slider is in an occupant-restraining position, the warning device detects in a contactless fashion by a magnetic flux sensor whether or not a tongue fastened to one end of a webbing is latched in an emergency release buckle movable along with the slider. If they are found unlatched, the warning device urges the occupant to wear the webbing.

(2) Description of the Related Art

One example of passive seat belt systems to which a conventional warning device is applied is illustrated in FIG. 17. A residual portion of an occupant-restraining webbing 1 is taken up in an inner retractor 3 provided on a lower part of an inboard wall of a seat 2, while a free end portion of the webbing 1 is connected to a slider 5 by way of an emergency release buckle 4. The slider 5 is received movably back and forth along the length of a vehicle in a slide rail 7 mounted on a roof side of an inner wall of a roof of the vehicle. The slider 5 is driven by an unillustrated drive member such as a drive wire or drive tape which is paid out or taken up by a drive unit 8 operable responsive to each opening or closure of an associated door, so that the slider 5 is caused to move in and along the slide rail 7. Inside the drive unit 8, there is provided a reel (not shown) connected to an unillustrated motor. The drive member is wound on the reel, so that the drive member can be paid out or taken up. An anchor latch 9 is provided on a rear end portion of the slide rail 7. Extending between the anchor latch 9 and the drive unit is a guide tube 10 made of a synthetic resin and adapted to guide movement of the drive member.

FIG. 17 also shows tube brackets 11 fixing the guide tube 10 on a body 6 of the vehicle, a limit switch 12 for detecting each displacement of the slider 5 to the frontmost end of the slide rail 7, and rail brackets 13 fixing the slide rail 7 on the body 6 of the vehicle.

To urge the fastening of the webbing 1 and to prevent any false detection of latching between the tongue 14 fastened to an end portion of the webbing 1 and the emergency release buckle in spite of actual unlatching thereof, such a passive seat belt system is provided with a warning device which is constructed of a magnet provided on the slider 5 and a magnetic flux sensor provided on the side of the body of the vehicle. The magnetic flux sensor is ON-OFF controlled by the existence or absence of a magnetic flux or field.

According to the above construction, except when the tongue 14 is latched in the emergency release buckle 4 and the slider 5 is firmly restrained in the anchor latch 9, the magnetic flux sensor is turned off so that a warning means connected to the magnetic flux sensor is actuated to achieve the designed object.

However, the magnetic flux sensor is actuated responsive to a magnetic flux or force in the conventional warning device for the passive seat belt system. If a device having a magnet, for example, a speaker, an electric motor or the like is brought close the magnetic flux sensor, the magnetic flux sensor is actuated in a false by the magnetic force of the magnet, leading to a potential problem that the reliability of the warning device for the passive seat belt system may be impaired.

SUMMARY OF THE INVENTION

It is therefore an object of this invention to protect the magnetic flux sensor from all magnetic forces other than the magnetic force of the magnet provided in the emergency release buckle 4 in the aforementioned warning device for the passive seat belt system.

The magnetic flux sensor is designed to detect a variation in magnetic flux, which occurs by an approach of the magnet toward the magnetic flux sensor when the tongue 14 is inserted and latched in the emergency release buckle 4. It is therefore difficult or impossible to provide a large difference in magnetic flux between the latched tongue and the unlatched tongue, where the magnetic flux sensor and magnet are located apart from each other. In addition, the slider 5 and anchor latch 9 are made of steel which is a ferromagnetic material. Accordingly, the magnetic flux sensor is affected by them and its sensitivity is lowered.

There are a wide variety of magnetic flux sensors, including Hall elements, magnetic resistance elements and reed switches. They include those susceptible to impacts or external forces. The passive seat belt system is mounted inboard a vehicle body panel and is covered simply by an interior finish. However, a slot is also formed in the interior finish along the path of movement of the slider 5. Accordingly, the passive seat belt system is exposed there to the room of the vehicle. There is thus a potential danger that an external force may be applied accidentally to the magnetic flux sensor. It is hence necessary to protect the magnetic flux sensor from external forces.

Accordingly, it is another object of this invention to enhance the sensitivity of the magnetic flux sensor and also to protect the magnetic flux sensor in the warning device for the passive seat belt system.

It has now been found that the former object can be achieved by incorporating, in the conventional warning device for the passive seat belt system, a magnetic shielding means made of a high-permeability material and allowing magnetic flux to pass under low magnetic resistance to the magnetic flux sensor except for an area on a magnetic-flux-travelling path extending from the magnet to the magnetic flux sensor.

Because of the magnetic shielding means, no magnetic force other than the magnetic force of the magnet provided in the emergency release buckle is applied to the magnetic flux sensor. Even when a magnet-equipped device, for example, a speaker or electric motor is brought close to the magnetic flux sensor, the magnetic force of the magnet of the device does not reach the magnetic flux sensor so that the magnetic flux sensor is prevented from false actuation and the reliability of the warning device for the passive seat belt system is improved.

It has also been found that the latter object can be attained by arranging the magnetic flux sensor between the anchor base member and the emergency release buckle at a position closer to the emergency release buckle than the anchor base member.

By bringing the magnetic flux sensor closer to the emergency release buckle, the sensitivity of the magnetic flux sensor can be enhanced and the influence of peripheral magnetic materials can be minimized.

BRIEF DESCRIPTION OF THE DRAWINGS

The above and other objects, features and advantages of the present invention will become apparent from the following description and the appended claims taken in conjunction with the accompanying drawings in which:

FIG. 12 is a fragmentary cross-sectional view of a warning device according to an eighth embodiment of this invention, which is suitable for use in a passive seat belt system;

FIG. 13 is a fragmentary front elevation of a warning device according to a ninth embodiment of this invention, which is suitable for use in a passive seat belt system;

FIG. 14 is an enlarged cross-sectional view taken along line XIV—XIV of FIG. 13;

FIG. 15 is a fragmentary front elevation of a warning device according to a tenth embodiment of this invention, which is suitable for use in a passive seat belt system;

FIG. 16 is an enlarged cross-sectional view taken along line XVI—XVI of FIG. 15.

DETAILED DESCRIPTION OF THE INVENTION AND PREFERRED EMBODIMENT

The warning devices according to the first to tenth embodiment of this invention, which are suitable for use in a passive seat belt system, will hereinafter be described with the accompanying drawings. The passive seat belt system has a similar overall construction to conventional passive seat belt systems, so that its description is omitted herein.

Figure 1:
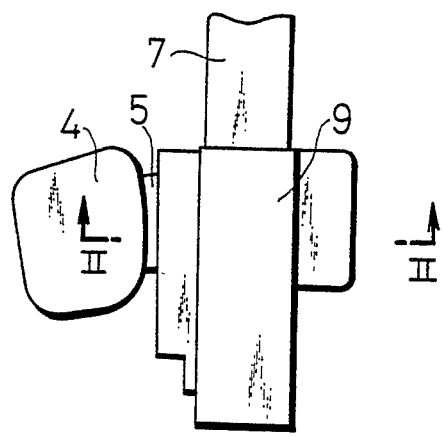
FIG. 1 is a fragmentary front elevation of a warning device according to a first embodiment of this invention, which is suitable for use in a passive seat belt system.
Figure 2:
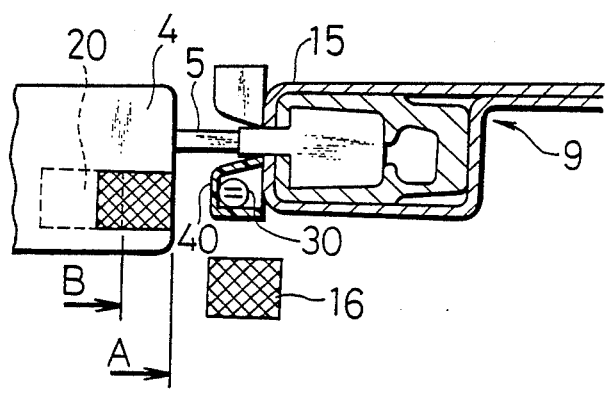
FIG. 2 is an enlarged cross-sectional view taken along line II—II of FIG. 1.

FIGS. 1 and 2 illustrate the warning device according to the first embodiment of this invention.

Figure 17:
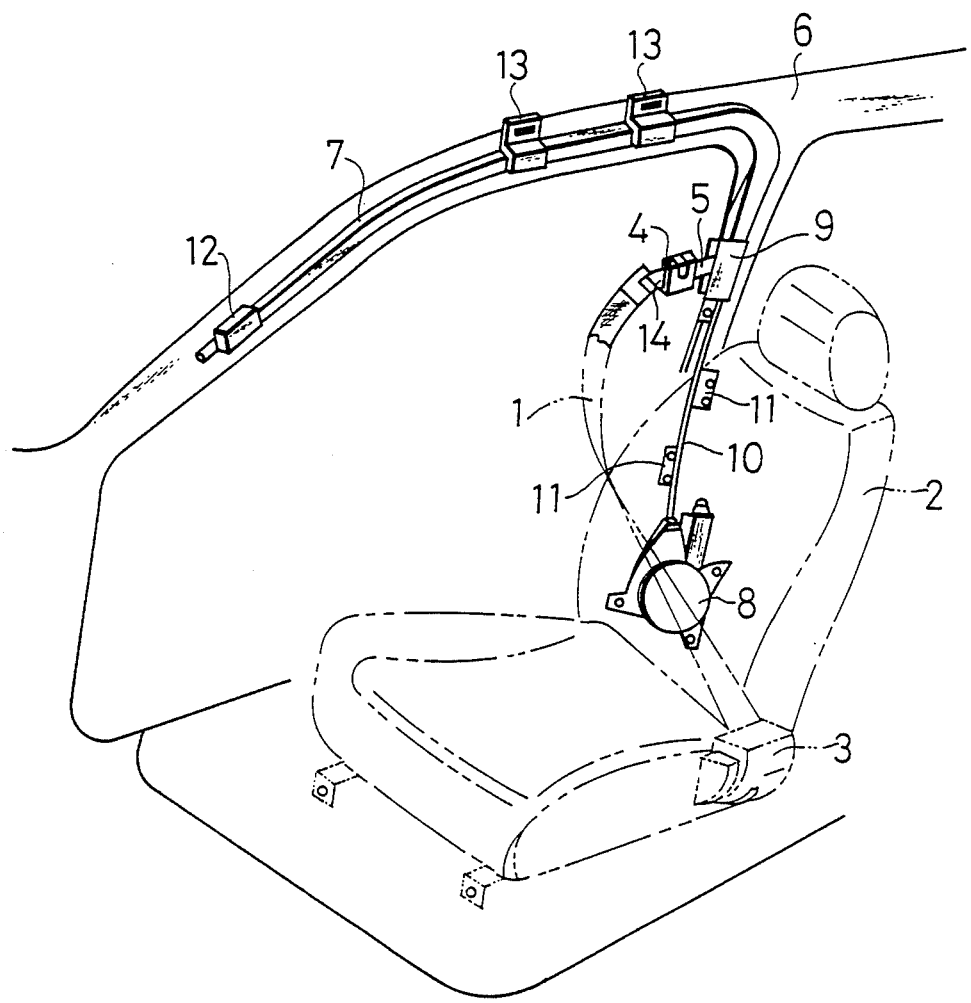
FIG. 17 is a simplified overall perspective view of a passive seat belt system to which each warning device according to this invention can be applied.

Describing the construction of the warning device in detail, the emergency release buckle 4 is provided with a magnet 20 which moves to a position A when the tongue 14 attached to the end portion of the webbing 1 (see FIG. 17) has been inserted and latched and to a position B when the tongue 14 has been unlatched.

On the other hand, in the anchor latch 9, an anchor base 15 for bearing pulling forces applied from the webbing 1 to the slider 5 is provided with a reed switch 30 as a magnetic flux sensor 30, said reed switch 30 being turned on or off only when the slider 5 assumes the occupant-restraining position and the magnet 20 of the emergency release buckle 4 is at the position A. The reed switch 30 is housed within a magnetic flux sensor casing 40 attached to the anchor base 15.

According to the above construction, the reed switch 30 is turned off to actuate an unillustrated warning means connected to the magnetic flux sensor 30 unless the tongue 14 is latched in the emergency release buckle 4 and the slider 5 is firmly restrained in the anchor latch 9.

Figure 3:
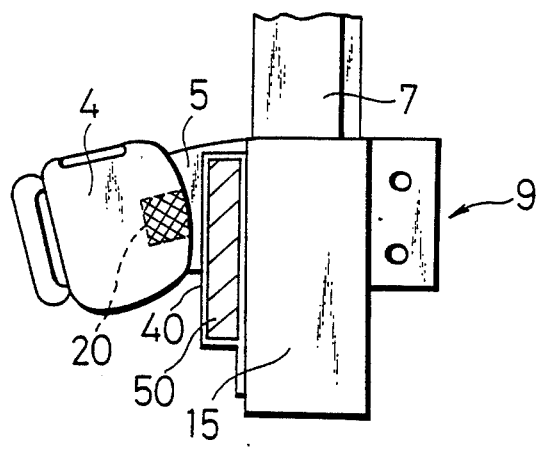
FIG. 3 is a fragmentary front elevation of a warning device according to a second embodiment of this invention, which is suitable for use in a passive seat belt system.

FIG. 3 illustrates an essential part of the warning device according to the second embodiment.

In FIG. 3, a magnetic flux sensor casing 40 with a reed switch housed therein is attached to the anchor base 15. On an inboard side wall of the magnetic flux sensor casing 40, there is provided a magnetic shield 50 having a rectangular shape and made of a high-permeability material allowing a magnetic flux to pass under low magnetic resistance therethrough, for example, iron, nickel, cobalt, manganese or the like.

In the second embodiment, the magnetic shield 50 is formed as a magnetic shielding means except for an area on a magnetic-flux-travelling path extending from the magnet 20 attached to the emergency release buckle 4 to the reed switch 30. No magnetic forces other than the magnetic force of the magnet 20 attached to the emergency release buckle 4 are therefore applied to the reed switch 30. Even if a magnet-equipped device, for example, a speaker a speaker, an electric motor or the like is brought close the reed switch 30, the magnetic force of the device acts on the magnetic shield 50 and does not reach the reed switch 30. Thus, the reed switch 30 is prevented from false actuation and the reliability of the warning device is improved.

Since the magnetic shield 50 can be attached to the magnetic flux sensor casing 40 by any of various fixing means known to date, such as adhesion, melt-bonding, snug-fitting, screw-fixing, reveting or the like, the warning device can be manufactured and assembled with ease.

It is to be noted that the magnetic shield 50 is not limited to such a rectangular shape as described above but can be formed in various shapes. Effects similar to the embodiment described above can also be brought about even when the magnetic shield 50 is attached directly to the anchor base 15.

Figure 4:
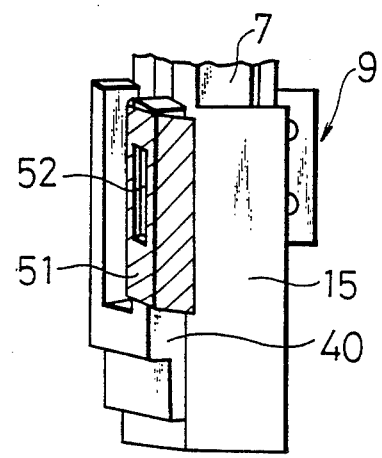
FIG. 4 is a fragmentary perspective view of a warning device according to a third embodiment of this invention, which is suitable for use in a passive seat belt system.

FIG. 4 illustrates an essential part of the warning device according to the third embodiment of this invention.

In FIG. 4, a magnetic flux sensor casing 40 with a reed switch housed therein is attached to the anchor base 15. A magnetic shield 51 made of a high permeability material allowing a magnetic flux to pass therethrough under low magnetic resistance, for example, iron, nickel, cobalt, manganese or the like and having a square U-shaped transverse cross-section is attached on the peripheral walls of the magnetic flux sensor casing 40.

To allow a magnetic flux to reach from the magnet 20 attached to the emergency release buckle 4 to the reed switch 30, a small hole 52 of an elongated rectangular shape is formed through the magnetic shield 51 on the side of the emergency release buckle 4.

In the third embodiment, the magnetic shield 51 made of the high-permeability material which allows a magnetic flux to pass under low magnetic resistance therethrough is formed as a magnetic shielding means on the peripheral walls of the magnetic flux sensor casing 40 except for the small hole 52 through which a magnetic flux is allowed to travel from the magnet 20 attached to the emergency release buckle 4 to the reed switch 30. Accordingly, the third embodiment can of course exhibit similar effects as the foregoing embodiments. In addition, compared to the foregoing embodiments, the third embodiment has superior magnetic shielding ability for protecting the reed switch 30 from magnetic forces other than the magnetic force of the magnet 20 attached to the emergency release buckle 4.

Figure 5:
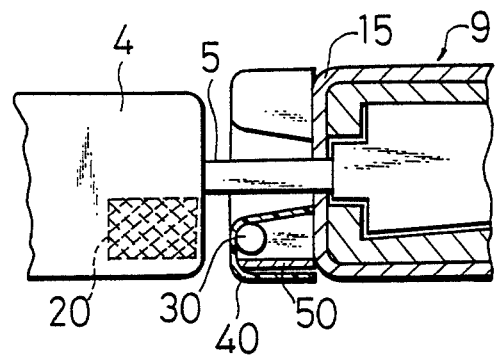
FIG. 5 is a cross-sectional view of a warning device according to a fourth embodiment of this invention, which is suitable for use in a passive seat belt system.

FIG. 5 illustrates an essential part of the warning device according to the fourth embodiment.

In FIG. 5, the anchor base 15 is provided with a magnetic flux sensor casing 40 in which the reed switch 30 is housed. Inside the magnetic flux sensor casing 40, a magnetic shield 50 made of a high-permeability material allowing a magnetic flux to pass under low magnetic resistance therethrough, for example, iron, nickel, cobalt, manganese or the like has been embedded together with the reed switch 30 by a molding technique or a similar technique so that the magnetic shield 50 is located along an inboard side wall of the magnetic flux sensor casing 40.

The fourth embodiment can bring about similar effects as the second embodiment described above. The magnetic shield 50 is embedded together with the reed switch 30 within the magnetic flux sensor casing 40 by a molding technique or a similar technique. The magnetic shield 50 can therefore be incorporated concurrently with the molding of the reed switch 30 within the magnetic flux sensor casing 40 in the fabrication step of the magnetic flux sensor casing 40. The provision of the magnetic shield 50 can therefore be achieved easily without increasing the number of fabrication steps, thereby making it possible to minimize the increase of the manufacturing cost.

Figure 6:
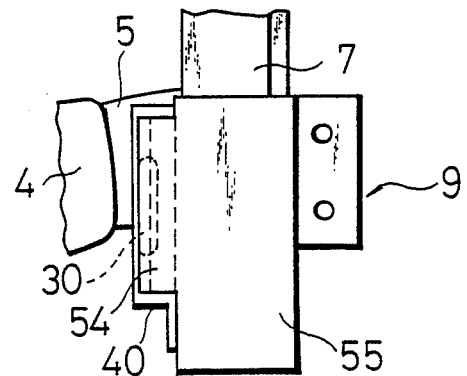
FIG. 6 is a fragmentary front elevation of a warning device according to a fifth embodiment of this invention, which is suitable for use in a passive seat belt system.
Figure 7:
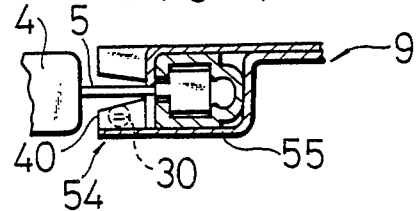
FIG. 7 is a fragmentary cross-sectional view of the warning device of FIG. 6.

FIGS. 6 and 7 illustrate an essential part of the warning device according to the fifth embodiment of this invention.

In FIGS. 6 and 7, a magnetic flux sensor casing 40 with the reed switch 30 housed therein is provided on an anchor base 55. The anchor base 55 has an extension 54 extending toward the emergency release buckle 4. The extension 54 lies over an inboard side wall of the magnetic flux sensor casing 40, so that the inboard side wall of the magnetic flux sensor casing 40 is covered by the extension 54.

Since the anchor base 55 is generally made of a high-permeability material allowing a flux to pass under low magnetic resistance therethrough, for example, a single metal such as iron, nickel, cobalt or manganese or an alloy containing at least one of such metals as a principal component, the extension 54 of the anchor base 55 exhibits similar effects as the magnetic flux shield 50 in the second embodiment described above.

The fifth embodiment can bring about similar effects as the second embodiment described above. In addition, the extension 54 of the anchor base 55 can be formed simultaneously in the fabrication step of the anchor base. The magnetic shielding means can therefore be formed easily without increasing the number of fabrication steps, thereby making it possible to minimize the increase of the manufacturing cost.

In this invention, the magnetic shields 50, 51 and 54 in the above-described embodiments can each be formed by a coating formed on the surface of the magnetic flux sensor casing 40. In this case, it is only necessary to coat the surface of the magnetic flux sensor casing 40 with a high-permeability material. The magnetic shielding means can be formed easily, for example, by coating with a readily-available electroconductive coating formulation or plating with a readily-available high-permeability material.

In each of the above embodiments, the location where the magnetic shielding means is formed is not limited to the location described above. As already described in connection with the third embodiment, the magnetic shielding means may be formed along the entire circumference of the magnetic flux sensor casing 40. Further, the formation of a magnetic shielding means along each of the axial end walls of the magnetic flux sensor casing 40 is also meaningful for improving the magnetic shielding performance.

In each of the above embodiments, the reed switch 30 is used as an element for detecting a magnetic flux from the magnet 20 attached to the emergency release buckle 4. The element for detecting a magnetic flux is however not limited to the reed switch 30. The present invention can be practised so long as a magnetic flux sensor capable of detecting a magnetic flux for actuation is used, such as a Hall element.

In each of the above embodiments, the reed switch 30 is provided as a magnetic flux sensor on the anchor latch equipped with the anchor base 15 or 55. It is also possible to apply this invention to the conventional anchor latch 9 equipped with anchor pins. This can be done by replacing the anchor base 15 or 55 with a constituent member of the anchor latch, such as the casing.

Figure 8:
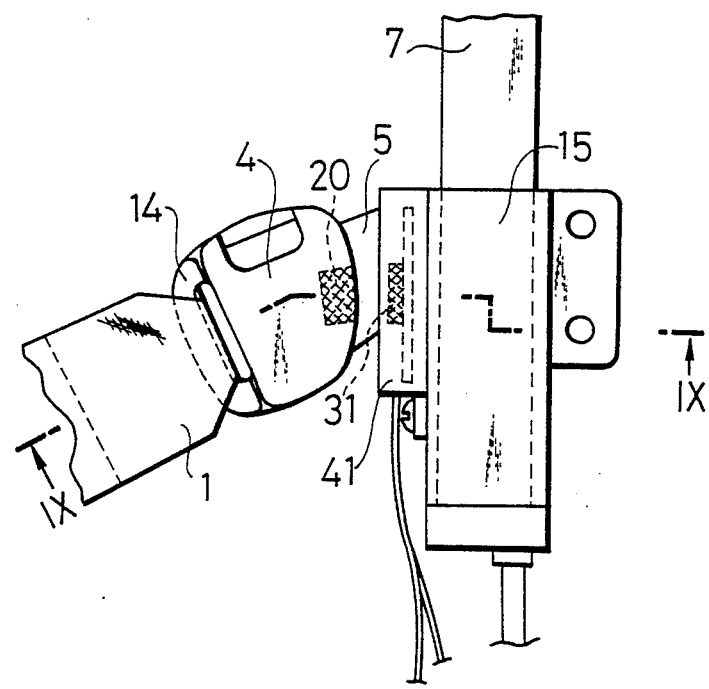
FIG. 8 is a fragmentary front elevation of a warning device according to a sixth embodiment of this invention, which is suitable for use in a passive seat belt system.
Figure 9:
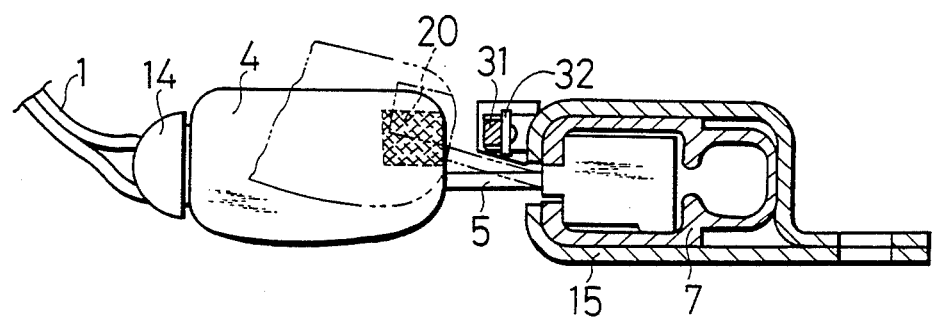
FIG. 9 is an enlarged cross-sectional view taken along line IX—IX of FIG. 8.

The sixth embodiment of this invention is depicted in FIGS. 8 and 9. The sixth embodiment is a basic embodiment for the remaining embodiments starting from the seventh embodiment.

The emergency release buckle 4 is mounted on the slider 5 which moves along the slide rail 7. Disposed inside the emergency release buckle 4 is the magnet 20 which assumes either one of first and second positions depending on the existence or absence of latching of the tongue 14. The first position is shown in the drawings, in which the magnet 20 is located close to a magnetic flux sensor 31. In the second position, the magnet 20 is located away from the magnetic flux sensor 31. On an end portion of the slide rail 7, the anchor base member 15 is provided surrounding transversely the slide rail 7. When the slider 5 is in an occupant-restraining position, the anchor base member 15 remains engaged with the slider 5 to transmit to the body of the vehicle a pulling force applied via the emergency release buckle 4 in the event of a collision of the vehicle.

The magnetic flux sensor 31 is fixed on a printed circuit board 32 and is housed within the magnetic flux sensor casing 41, which is in turn attached to the anchor base member 15. The magnetic flux sensor casing 41 with the magnetic flux sensor 31 housed therein is provided between the anchor base member 15 and emergency release buckle 4, so that the magnet 20 inside the emergency release buckle 4 and the magnetic flux sensor 31 are close to each other. Accordingly, the magnetic flux varies considerably depending on the location of the magnetic flux sensor, namely, a large difference in magnetic flux takes place between the first position and the second position. The rate of change in the magnetic flux to which the magnetic flux sensor 31 is exposed increases, whereby the sensitivity is improved.

In addition, the magnetic flux sensor 31 extends out from the anchor base member 15 toward the emergency release buckle 4 so that the magnetic flux sensor 31 is hardly affected by the magnetic material of the anchor base member 15.

To allow the slider 5 to move inside the slide rail 7, it is necessary to leave an appropriate play between the slider 5 and the slide rail 7. Therefore, the slider 5 is tilted, normally, inboard by tension applied to the webbing. As shown in FIG. 9, the magnet 20 and magnetic flux sensor 31 are arranged at positions offset from a central axis of the slide rail 7, said central axis being as viewed in the transverse direction of the vehicle, toward the side of the room of the vehicle. When the slider 5 is tilted inboard, the magnet 20 and magnetic flux sensor 31 are rendered closer to each other. The rate of change in the magnetic flux to which the magnetic flux sensor 31 is exposed increases further, so that the sensitivity of the magnetic flux sensor 31 is improved further.

Figure 10:
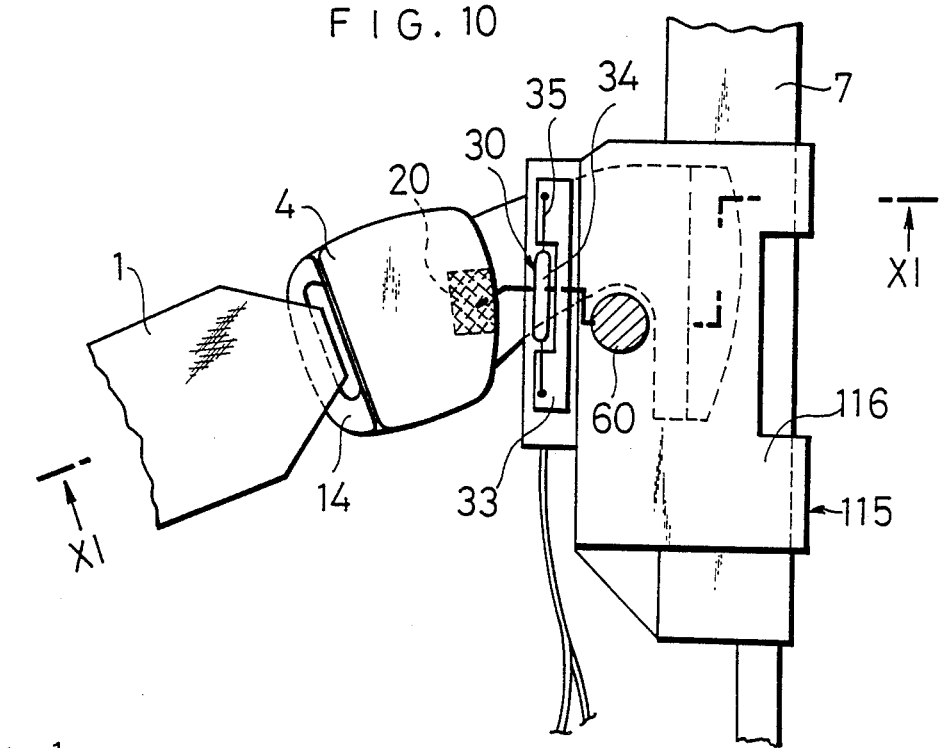
FIG. 10 is a fragmentary front elevation of a warning device according to a seventh embodiment of this invention, which is suitable for use in a passive seat belt system.
Figure 11:
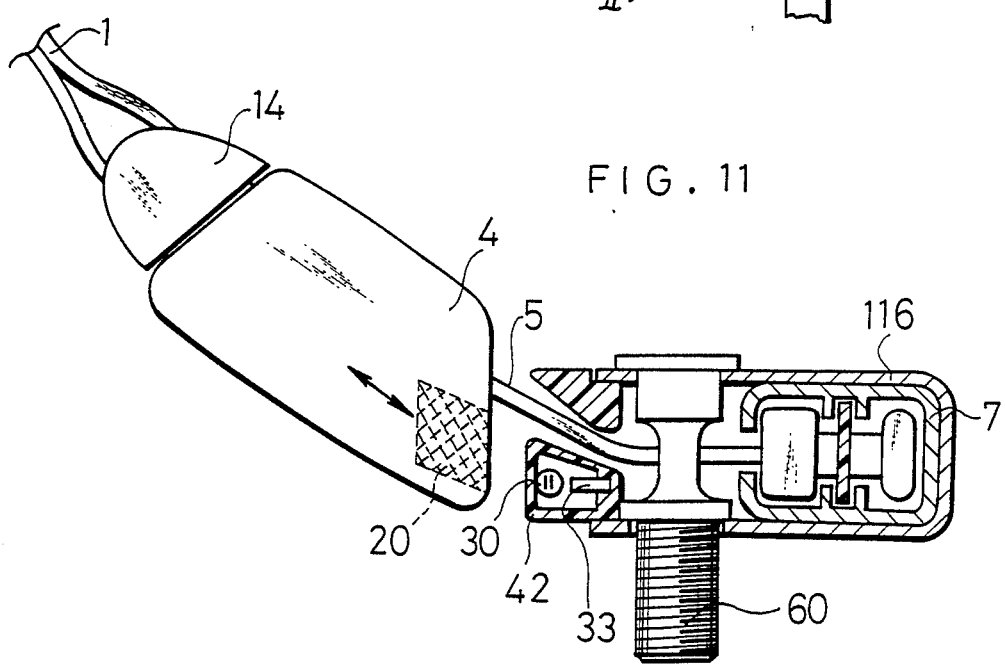
FIG. 11 is an enlarged cross-sectional view taken along line XI—XI of FIG. 10.

The seventh embodiment is shown in FIGS. 10 and 11. The seventh embodiment is different from the sixth embodiment in that the anchor base member 15 is formed of a bolt 60 and an anchor base 116. In this case, the slider 5 engages the bolt 60 to withstand a pulling force applied in the event of a collision of the vehicle. The anchor base 116 serves to maintain the relative positions of the bolt 60 and slide rail 7, but it is the bolt 60 that serves actually as an anchor member.

As the magnetic flux sensor, a reed switch 30 is shown by way of example. The switch 30 has a reed tube 34 and leads 35. They extend in the direction of movement of the slider 5. Even when the relative positions of the reed switch and magnet 20 are offset a little in the vertical direction as viewed in the drawings, the magnetic flux applied to the reed switch 30 remains substantially unchanged so that stable signals can be obtained.

The reed switch 30 has been enclosed within a magnetic flux sensor casing 42 subsequent to its soldering to a printed circuit board 33. The magnetic flux sensor casing 42 is fixed on the anchor base.

The eighth to tenth embodiments relate to the protection of the magnetic flux sensor. They are additional embodiments corresponding to the sixth embodiment depicted in the cross-sectional view (FIG. 9) taken along line IX—IX of FIG. 8.

FIG. 12 illustrates the eighth embodiment of this invention. The reed switch 30 is surrounded by a high-rigidity member 80 having a U-shaped transverse cross-section and is fixed with a filler within a magnetic flux sensor casing 43. Although the U-shaped transverse cross-section is shown in FIG. 12, the high-base rigidity member 80 may be a member having a square U-shaped cross-section or may be a circular or rectangular tube.

FIGS. 13 and 14 show the ninth embodiment of this invention. A portion of an anchor base member 21 is cut out and raised close to the magnetic flux sensor 31, thereby forming an extension 56. The extension 56 protects an essential part of the magnetic flux sensor 31 from external forces.

FIGS. 15 and 16 depict the tenth embodiment of this invention, which is a modification of the ninth embodiment. The extension 56 of the ninth embodiment has been replaced simply by a discrete member 57. In FIG. 16, the lower side is the inboard side.

Incidentally, the term "high-permeability" as used herein may be interpreted as "ferromagnetic" without causing any problem in understanding the technical significance of this invention.

I claim:

1. A warning device for a passive seat belt system, comprising:
    an emergency release buckle connected to a slider which moves along a slide rail arranged in a room of a vehicle;
    a tongue carrying an occupant-restraining webbing fastened thereto;
    a magnet displaceable between a first position and a second position, said magnet assuming the first position while the tongue and emergency release buckle are latched but a second position while the tongue and emergency release buckle are unlatched;
    an anchor base member maintained in engagement with the slider while the slider is at an occupant-restraining position, whereby a tension applied to the webbing may be transmitted to a body of the vehicle; and
    a magnetic flux sensor for detecting a magnetic flux from the magnet, said magnetic flux sensor being arranged between the anchor base member and the emergency release buckle.

2. The warning device as claimed in claim 1, wherein the magnetic flux sensor is mounted at a position offset from a central axis of the slide rail, said central axis being as viewed in the transverse direction of the vehicle, toward the side of the room of the vehicle.

3. The warning device as claimed in claim 1, wherein a magnetic-flux-sensitive portion of the magnetic flux sensor is arranged in a form elongated along the direction of movement of the emergency release buckle.

4. The warning device as claimed in claim 1, wherein a reed switch is used as the magnetic flux sensor, and a reed tube and leads of the reed switch are disposed along the direction of movement of the emergency release buckle.

5. The warning device as claimed in claim 1, wherein a part of the anchor base member extends in a direction approaching the emergency release buckle on a side inboard the magnetic flux sensor.

6. The warning device as claimed in claim 1, further comprising a high-rigidity member provided fixedly on the anchor base member and extending in a direction approaching the emergency release buckle on a side inboard the magnetic flux sensor.

7. The warning device as claimed in claim 1, further comprising a high-rigidity member surrounding the magnetic flux sensor.

8. The warning device as claimed in claim 1, further comprising a sensor casing attached to the anchor base member and housing the magnetic flux sensor therein.

9. The warning device as claimed in claim 8, wherein the magnetic flux sensor is fixed on a printed circuit board and is attached to the sensor casing via the board.

* * * * *